April 25, 1961 — H. C. LARSEN — 2,981,081
APPARATUS FOR COOLING VEGETABLE AND ANIMAL PRODUCTS
Filed Dec. 16, 1955

April 25, 1961   H. C. LARSEN   2,981,081
APPARATUS FOR COOLING VEGETABLE AND ANIMAL PRODUCTS
Filed Dec. 16, 1955   3 Sheets-Sheet 2
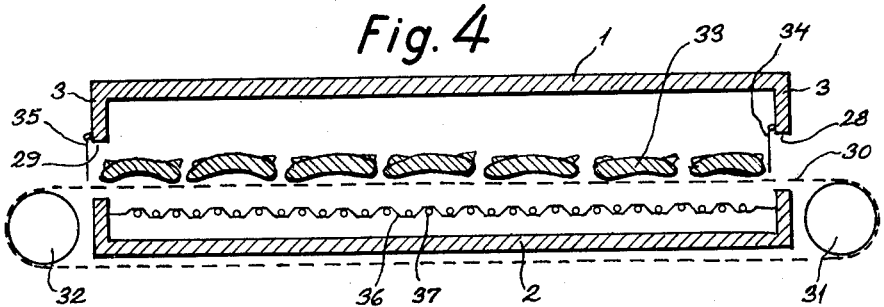
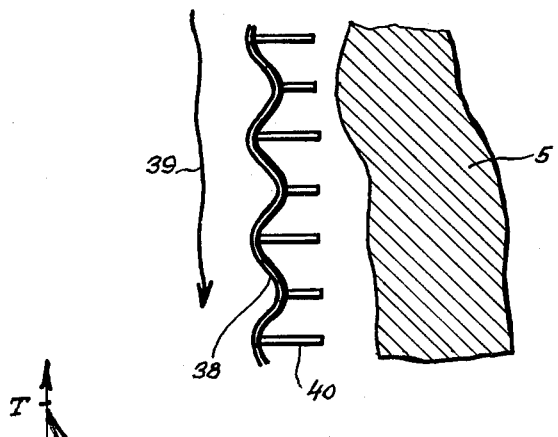
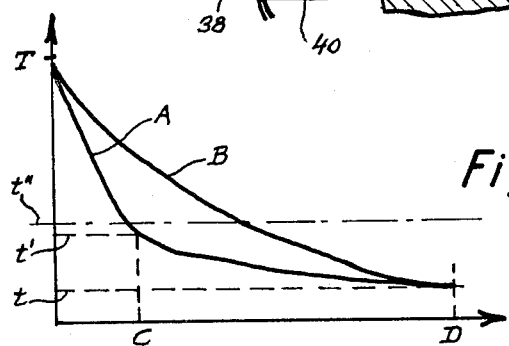

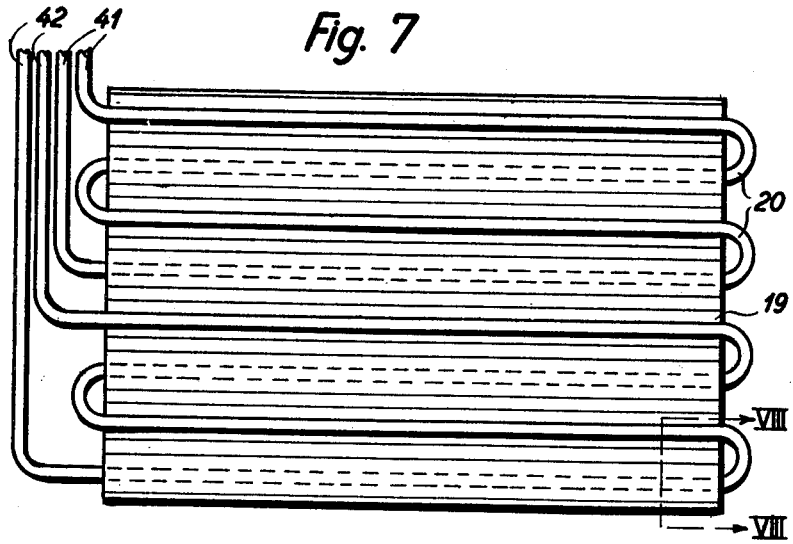
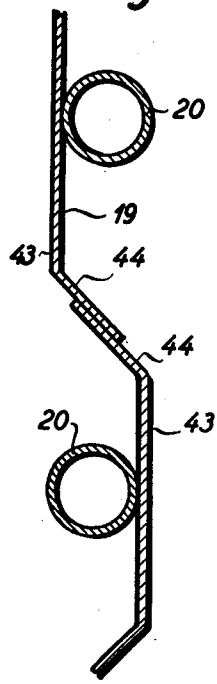
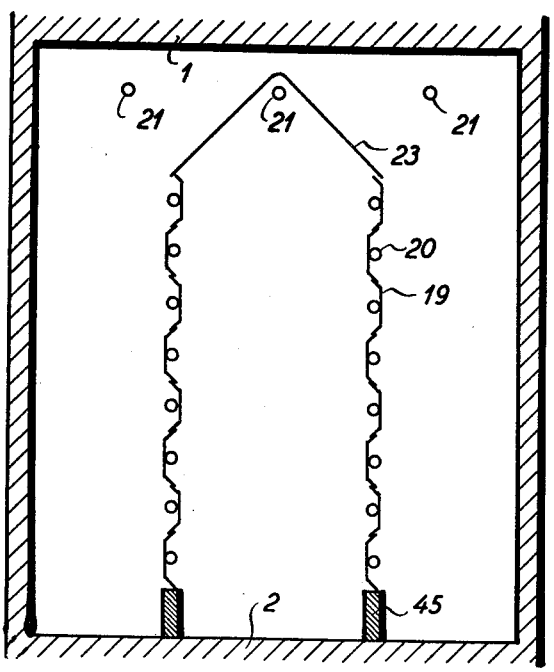

United States Patent Office 2,981,081
Patented Apr. 25, 1961

2,981,081

APPARATUS FOR COOLING VEGETABLE AND ANIMAL PRODUCTS

Hans Christian Larsen, Kongens Lyngby, Denmark, assignor to Aktieselskabet Thomas Ths. Sabroe & Co., Aarhus, Denmark, a limited-liability company of Denmark Filed Dec. 16, 1955, Ser. No. 553,614

5 Claims. (Cl. 62—378)

The present invention relates to a method of cooling animal and vegetable products, incorporating the application of convection and radiation, whereby is to be understood that the juicy products, which are preferably unpacked, are placed in one or several gases, or mixtures thereof. The method is thus distinguished from the so-called contact-cooling or contact-freezing, whereby the products are brought into direct contact with cooling members in the form of plates or shelves, sometimes even with application of pressure. The method is also essentially different from the so-called liquid-freezing, which e.g. is used for freezing fish. In this connection it is emphasized that in no manner does the method indicated by the invention comprise the cooling of fish.

It is also emphasized that the present method relates to industrial and commercial cooling, whereby animal products such as the meat of hogs, oxen, calves, sheep, poultry, and the like has to be cooled down immediately after slaughtering from normal temperature to slightly above zero, and has to be kept cooled for storage at this temperature, or whereby vegetable products such as fruit and vegetables have to be cooled down and to be stored in large quantities. It is also conceivable that the method can be applied to products, which are made from vegetable or animal original products, e.g. cheese.

The method according to the invention is also applicable to freezing, i.e. cooling to such temperature at which the liquid or the water in the treated product solidifies, as well as to continued cooling down to safe storage temperature or keeping temperature, and to maintain the product at such temperature. In this connection it should be mentioned that whereas by freezing there are provided temperatures slightly below zero, safe storage requires a temperature of e.g. —18 C. or lower, depending upon the nature of the product and the duration of the storing. For poultry even lower temperatures have been used, e.g. —35° C. It may be mentioned for comparison that in abattoirs the cooling is limited to 0–8° C., in Danish bacon factories e.g. 4–6° C.

As the temperature of the product has to be lowered to the desired value before the expiration of a predetermined period for reasons of capacity and economy of the cooling plant, the cooling according to the hitherto known methods has been accelerated by increasing the convection, the gas being thereby induced to sweep over the product, whereupon the gas gives off the absorbed heat to cooling means disposed e.g. in a separate room. In order to obtain the maximum abstraction of heat from the product by convection, use is made of blowers, and the gas is conducted over the exterior surfaces of the product.

As a rule, according to the known methods, a relatively considerable difference in temperature is maintained between the surfaces, the product and the cooling member, often 10–20° C., and this difference in temperature causes a corresponding difference in the partial vapour pressures. This involves a vigorous vaporisation of liquid from the surface of the product, whereby the product deteriorates in regard to quality, appearance, non-perishableness, and weight. As a consequence the efforts have hitherto been concentrated on maintaining the difference in partial vapour pressure at the surfaces of the cooling member and the product at the lowest possible value, and for this purpose, seeing that the difference in vapour pressure depends upon the difference in temperature and the relative humidity of the gas, the procedure adopted has been partly directed to maintain a low level of the difference in temperature and partly a high level of the relative humidity of the gas.

In order to limit the cooling period it has hitherto been necessary, however, at low difference in temperature to maintain a comparatively high velocity of the gas, and the high velocity entails an increase in the emission of heat and consequently in the vaporisation from the surface of the product. The small difference in partial vapour pressure desirable for the reduction of the vaporisation is thus counteracted by the increased convection. Theoretically, it should be possible to counteract the vaporisation by increasing the relative humidity of the gas, but in practice a natural limit is set to the degree of humidity by the fact that higher degrees of humidity involve the use of larger cooling members, and also that the surface of the cooled product must often be rather dry, which is due to the desirability of restricting the growth of bacteria.

As, according to methods of the nature described in the foregoing, no heat is removed from the product by transmission, as in the case of contact-freezing, the quantity of heat removed may be considered as being effected by three factors, i.e. vaporisation, convection, and radiation. The present invention is based on the recognition that when vaporisation, and consequently the loss of heat thereby entailed, has to be maintained below a certain value, it will not do to compensate for this by increasing the convection, as has been the practice hitherto, because vaporisation will then again be increased, but on the contrary that the contribution of convection to the total cooling effect has to be suppressed, and that the cooling must be expedited by increasing the abstraction of heat by radiation.

In conformity herewith the method according to the invention is characteristic in that the effect of cooling by radiation is increased at the expense of the convection, whereby a more expedient cooling is obtained in regard to loss of liquid in the product. As the product has to be cooled from a starting temperature to a substantially constant final temperature, a quantity of heat which is practically speaking constant has to be removed from a predetermined product, and it will be readily understood that whenever the contribution from radiation is increased, the contribution from convection will be correspondingly diminished. By the method according to the invention the radiation contribution may suitably be increased by disposing each individual unit of the products in such a manner in relation to cooling members that the unit of product may give off heat by direct radiation to the cooling member.

Already when each unit of the products is so disposed that more than 10 percent of the exterior surface of the unit may radiate heat to the cooling member, an appreciable reduction in the loss of liquid is obtained by the present method, as the radiation involves no abstraction of vaporised liquid from the product. The reduction is further improved, if more than one third of the exterior surface of the product unit is made to radiate heat to the cooling means.

The invention also relates to a cooling plant for carrying the novel method into effect, and according to the invention such plant is mainly characteristic in that the cooling member of the cooling plant is so designed and positioned in relation to the individual products and their carrying members that the emission of heat from each individual product to the cooling member by radiation is increased at the expense of the convection. The details of the invention will appear from the following description, reference being had to the drawing wherein:

Fig. 4 is a fourth embodiment,

Fig. 5 shows on an increased scale a fragment of a cooling member positioned in proximity to a product to be cooled, and Fig. 6 is a diagram to illustrate the course of the cooling.

Fig. 7 shows an enlarged elevation view of a cooling member as used in the embodiment of the plant shown in Fig. 2, and Fig. 8 is an enlarged sectional fragmentary view along line VIII—VIII in the direction of the arrows, as indicated in Fig. 7.

Fig. 9 shows a schematical transverse section, similar to Figs. 1 to 3, a further embodiment of the plant.

Figure 1:
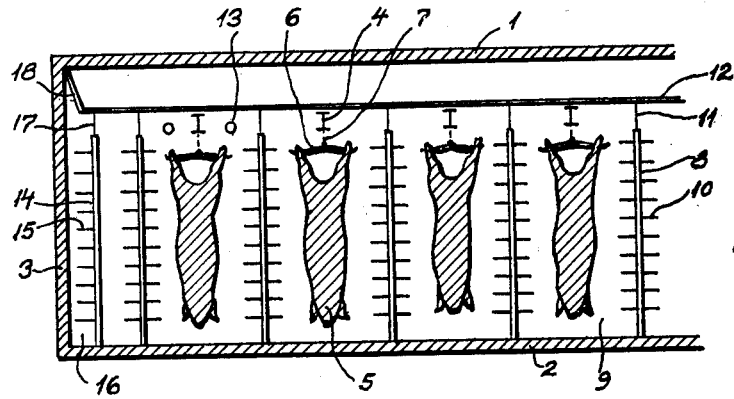
Fig. 1 shows schematically a transverse section through part of one constructional form of cooling plant to carry the method according to the invention into effect.

The cooling plant shown in Fig. 1 comprises a cooling room, the ceiling, floor, and walls of which are denoted with the numerals 1, 2, and 3, respectively, and in the cooling room there are provided in the usual manner rails 4, from which the products 5, which are to be cooled or frozen, are suspended. If the products 5, as presupposed in the shown example, consist of hog's carcasses, they can in any suitable manner be suspended in their hind legs from bows 6, which by means of chains 7 are connected with rollers, not shown, which may travel on the lowermost flanges of the U-shaped rails 4, as is well-known in the art.

The bottom part of the cooling room is subdivided by means of wall elements 8, serving as cooling members, into smaller compartments 9 in such a manner that each of the products 5 is surrounded by elements 8. Dependent upon the shape of the product there may be disposed further cooling elements, not shown.

In the shown embodiment the cooling members 8 are disposed as vertical walls and provided with substantially horizontally protruding plates 10 or other suitably designed braking members to prevent movement of the gas contained in the cooling room. If the cooling members are disposed substantially horizontally, see e.g. Fig. 4, the tendency of the gas to circulate is so small that such braking members can be dispensed with in certain cases.

In the top part of the room the wall elements 8 may be continued with wall pieces 11, which are attached to a subceiling 12, whereby for each product a separate compartment 9 is formed. As indicated in Fig. 1, cooling elements 13 may also be disposed above the product.

When the gas contained in the compartment 9 receives heat from the product 5, it will tend to move upwardly, but this flow is countered by the cooling of the gas in the top part of the room by contact with the elements 13, and consequently it will tend to move downwardly. The convection in the compartment 9 is thus suppressed by means of the elements 13.

At the walls 3 of the cooling room there may be disposed cooling members 14 provided with braking plates 15 to prevent circulation of the gas between the wall and the cooling element, impelled by heat penetrating through the wall 3. The space 16 enclosed between the wall 3 and the cooling element 14 may also be entirely closed, e.g. in a manner similar to that of the individual compartments 9 between the cooling elements 9, by extending the element 14 up to the sub-ceiling 12 by means of a wall piece 17.

The sub-ceiling 12 may continue horizontally to the wall 3, but it is preferably continued to the corner, where the wall 3 abuts against the ceiling 1, by means of an inclined connection piece 18. It is obtained by this means that the cooling member 14 also contributes to balancing the heat flowing in from the surroundings of the cooling room through the wall 3 above the height of the ceiling 12.

During operation of the cooling plant shown in Fig. 1 the products 5, e.g. hog's carcasses, after having been suspended from the bows 6 are moved through the plant, when the chains 7 are moved forward in longitudinal direction of the rails 4. The product may hereby be moved on a rectilinear course through the plant. Preferably, however, in order to avoid a too long plant the product is moved forward on a winding course, e.g. first through the compartment 9, shown to the left in Fig. 1, and next back through the following compartment 9. Alternatively, the product may thereupon again be moved forward through the third compartment 9 and possibly back again through the fourth compartment 9, as it is desired. Whether the product is moved through one or two or more compartments 9, the course of the cooling can be controlled by imparting different temperatures to the cooling members 8, reckoned in the travelling direction of the product through the plant. However, it is conceivable that the plant is operated in the way that the products are just suspended between the cooling members, the temperatures of which is then varied so as to obtain the course of cooling aimed at.

Each individual cooling member 8 may, if desired, also be subdivided into sections in vertical direction, as will be further explained with reference to Fig. 7, which sections are so separated from one another that each section can be maintained at a temperature different from that of the adjoining section or sections. In this case the temperatures are so adjusted that each section of the cooling member 8 has a different temperature than that of the section placed above the one considered. By a suitable subdivision of the cooling member 8 into sections it is obtainable that the heights of the sections become so small that the tendency on the part of the gas in the compartment 9 to circulate and transmit heat from the product 5 to the cooling member 8 by convection is but negligible.

It is obvious that it will be possible to subdivide the cooling means into vertical sections as well as to use cooling means, disposed to the travelling direction of the product, with different temperatures. In this way, it is possible to provide a cooling or freezing of practically any desired course. E.g., meat may be cooled from normal temperature to slightly above zero, and at a later stage the product may be frozen, and subsequently, if desired, the product may be frozen down to e.g. $-35°$ C., if poultry is the product concerned.

As explained in the foregoing, it is important according to the invention that the effect of cooling by radiation be increased at the expense of the effect of cooling by convection. To obtain this, each individual unit of the products must be so placed in relation to radiation cooling means that the product unit may emit heat by direct radiation to the cooling member which should be placed as close to the surface of the product as possible without touching same, however. If the cooling member should happen to touch the product, discoloration would ensue in the case of meat. Of course, this drawback has to be avoided, but on the other hand the space for the gas between cooling member and product must be as small as possible, so that there is no scope for a vigorous circulation, and, besides, the intensity of the radiation would naturally be diminished by too much distance.

Figure 2:
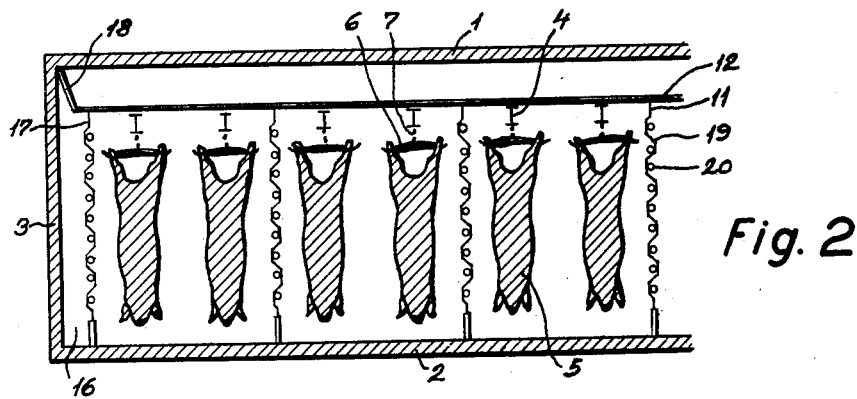
Fig. 2 is a second constructional form of the plant.

In the plant shown in Fig. 1 a relatively slight difference in temperature between product and cooling member will be sufficient, as each product is exposed to cooling members on either side. However, in order to increase the capacity of the plant it is possible to place two products 5 between each two cooling members 19, as shown in Fig. 2. Apart from the arrangement of the cooling members, the main parts of the plant are the same as in the embodiment according to Fig. 1, provided, however, that the cooling member 14 disposed next to the outer wall 3 as shown in Fig. 1, is also omitted in the cross section shown in Fig. 2.

In Fig. 2 each cooling member 19 comprises a corrugated plate, in whose inwardly directed parts there are disposed tubes 20 alternately on either side, through which said tubes a cooling medium flows.

As shown in Fig. 8, the corrugated plates of the cooling member 19 consist of vertical parts 43 the upper and lower edges of which are extended into inclined marginal edge portions 44. The upper edge portion of one plate 43 is in a convenient manner such as by welding secured to the lower edge portion 44 of the adjacent plate 43.

Each of the tubes 20 may have its separate temperature, but preferably the tubes form sections comprising two or more tubes, so that each section of tubes constitutes a tube coil, Fig. 7, through which a refrigerant is circulated, the temperature of which can be regulated in a suitable manner, not shown. In Fig. 7 the tubes 20 constitute two coils, the supply of refrigerant to which is provided for through pipes 41 or 42, respectively, connected to a source of refrigerant, the flow of which is controlled in any suitable manner such as by valve means or the like.

In the embodiment shown in Fig. 2, the cooling members 19 do not extend in the entire height of the cooling compartments 9 but are supported at the bottom thereof on bearings, as indicated in Fig. 2. However, the cooling members extend in full opposite the products 5 so that in this constructional form of the plant according to the invention roughly one half of the exterior surface of each product unit is capable of radiating heat to the cooling members 19, 20, and this has proved exceedingly satisfactory. Often, however, there is no need for a cooling so rapid as the one obtainable with the plant according to Fig. 2, and the result has therefore been arrived at that with due regard to capacity on one side and economy on the other it will in many cases be sufficient, if only more than 10 percent of the exterior surface of the product unit is capable of radiating heat to primary cooling members.

Figure 3:
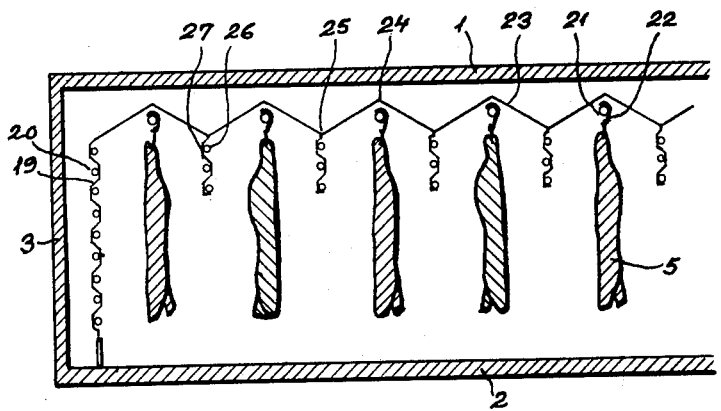
Fig. 3 shows in like manner a third embodiment.

The constructional form of a cooling plant according to the invention, shown in Fig. 3, is thus also most satisfactory in regard to capacity. In this form of the plant a plurality of bearings or rails 21 are disposed in a cooling room, which comprises ceiling 1, floor 2, and walls 3, which said rails carry hooks 22, the other ends of which are are attached to the products 5. Below the ceiling 1 of the cooling room and above the rails 21 there is fitted in a suitable manner a sub-ceiling 23, having its uppermost angular points 24 disposed above the rails 21 and its lowermost angular points 25 approximately at the same height as the uppermost end of a product 5, when the later is suspended from the hook 22.

A cooling member 19, 20 is positioned next to the wall 3 of the cooling room, and between each of two products following upon one another in the lateral direction there are suspended cooling members 26, 27 from the lowermost points 25 of the sub-ceiling, said members comprising corrugated plates 26 and tubes 27 similar to the cooling members 19, 20, but having materially lower height, so that approximately one third only of the exterior surface of each product unit radiates heat direct to the cooling members. By this embodiment a somewhat increased convection takes place as compared with those already described, as gas from the cooling members 26, 27 descends between the products, whereas gas rises at the surface of the products on account of its being heated from the latter. Even if some heat is thus abstracted by convection from the product, the convection will still be materially smaller than that of hitherto known convection plants, partly because the period of cooling is shortened on account of the intense radiation, so that the convection is not left much time to take effect, partly because the loss of heat through convection is diminished by the quantity of heat abstracted by radiation. In the plant as shown in Fig. 3, conveniently the products 5 are suspended so as to place the bulky parts thereof in opposed positions to the cooling members 26, 27.

In the embodiments described heretofore the cooling members are designed as vertical walls, and the products are moved through the plant suspended from bows or hooks. However, the plant according to the invention may be designed as shown in Fig. 4 with an equally good effect. Also here the cooling room comprises ceiling 1, floor 2, and walls 3. In the walls 3 there are provided apertures 28 and 29, through which the uppermost run of a belt conveyor 30 may pass. Inside the cooling room the conveyor belt 30 moves from the right to the left in Fig. 4, running over pulleys 31 and 32, which in the shown embodiment have diameters so large that the lowermost run of the belt conveyor is below the floor 2.

The conveyor belt 30 may e.g. consist of an endless wire cloth of metal wire or the like, which is capable of carrying the products 33. For this purpose it is possible to have idlers, not shown, within the cooling room, or the wire cloth may slide with its edges on supporting rails or rollers, not shown in the drawing either. The belt conveyor 30 carrying the products 33 may pass into the cooling room through the right-side aperture 28, whereby the products push open the door 34 of the aperture, and when the products arrive at the left-side aperture 29, they push open its door 35. When a product has passed one of the doors 34 or 35, the latter will again return into place, so that the cooling room is kept closed as far as possible.

In the lowermost part of the cooling room below the run of the conveyor belt there is disposed a cooling member comprising a corrugated plate 36, in the corrugations of which there are disposed cooling tubes 37 alternately on the uppermost side and on the lowermost side. A cooling medium flows through said cooling tubes 37, either separately or in groups, so that predetermined temperatures can be maintained as desired in the different parts of the cooling room in its longitudinal direction.

During the passage of the belt conveyor through the wire cloth to the cooling member 36, 37, and as the said member is in the lowermost position here there is no risk of convection at the lowermost side of the product. From the uppermost side of the product heated gas may move upwardly, whereby some heat is given off from the product in upward direction. This emission of heat may be sufficiently countered by suitable insulation, not shown, of the ceiling and possibly also the walls of the cooling room, so that they will soon get the temperature of the products, or, if desired, overhanging cooling members may be provided immediately above the products, like the cooling members 13 in Fig. 1.

According to the invention cooling members may be provided in combination with a convection cooling plant, which said members emit heat by convection and preferably absorb heat from the product by radiation. This may be obtained e.g., as shown in Fig. 5, by corrugating the cooling member 38, so that the total surface exposed to convection, when a gas flow is directed past the surface as indicated by an arrow 39, is larger than the surface of the cooling element in projection at right angles to the product 5. The braking plates 40 preferably have the same direction as the lines of projection.

The embodiment shown in Fig. 5 makes it possible that the cooling member need not, in contradistinction to the usual plants, be cooled direct by vaporising cooling medium or a carrier of cold, seeing that the convection by means of the highly increased surface of the cooling element 28 may become sufficient to remove the heat received by radiation from the product 5.

A modified embodiment of the plant according to Fig. 2 is shown in Fig. 9 in which the ceiling and floor are denoted with the references 1 and 2, respectively. The constructional details of the cooling members 19, 20 are presumed to correspond to those shown in Fig. 8, but it will be understood that said members may be built in another suitable way, e.g. as indicated in Fig. 1, or in Fig. 5.

In Fig. 9 the cooling member walls are carried on bearings or supports 45 resting on the floor. Said supports can be made of bricks, or of an extension of the bottom end of walls 19, 20. The compartment between the walls is closed at the top by the roof-shaped sub-ceiling 23, beneath the upper corner of which a rail 21 is located to carry the products, not shown. At the top of the lateral compartments outside the walls 19, 20, similar rails 21 are provided.

The embodiment shown in Fig. 9 enables the user to at the same time cool down different products which need different cooling effects, or such plant may be used to attain a predetermined course of the cooling, e.g. by first moving the products through the inner compartment and then through one of the outer compartments. Besides, the coils 20 may be arranged to provide separate sections, as explained with reference to Fig. 7.

The special advantages of the invention when applied to cooling and freezing plants, wherein the product is advanced through the cooling room continuously or discontinuously, will be explained with reference to Fig. 6.

The product is cooled from the temperature T to the temperature $t$, and in most cases it is desirable that the cooling proceeds in accordance with a curve as the one denoted A in Fig. 6, i.e. that in the first stage a rapid cooling to a temperature $t'$ is effected, and that the product is thereupon subjected to a prolonged after-cooling to the final temperature $t$.

According to the generally known methods of cooling by convection, however, the gas in the cooling room sweeps over the product in such a manner that the cooling proceeds according to a more levelled curve B, which is partly due to the progressing change in the state of the gas in regard to temperature and humidity contents, partly to the circumstance that often the cooling plant for reasons of economy is not dimensioned according to the peak load at the beginning of the cooling, but according to a mean temperature $t''$ of the product.

On the contrary, by the cooling plant according to the invention different temperatures may be maintained in the cooling members, reckoned in the travelling direction for the product through the plant, so that by suitable selection of temperatures and dimensions of the first cooling elements it is possible to obtain cooling to the temperature $t'$ already at the time C. The remaining cooling elements may thereby be made smaller or have higher temperatures, so that the after-cooling may be extended over a suitable interval of time to the time D.

It will be understood from the foregoing that the shown details of the cooling plant according to the invention may be varied and further developed in several respects, when only the emission of heat by radiation is increased at the expense of the convection effect, and when the plant is so designed and arranged that the surfaces of the product may give off heat by radiation to the cooling members, which may be positioned vertically or horizontally or both.

What I claim and desire to secure by Letters Patent is:

1. A cooling plant for cooling moisture-containing products comprising, in combination, a cooling chamber, cooling members extending substantially vertically within said chamber, product supporting means disposed in said chamber to expose at least part of each unit of product to said cooling members, and means to suppress convection adjacent the products, said last-named means comprising a plurality of vertically spaced-apart braking strips extending away from the cooling members and substantially at right angles to the direction of the natural convection circulation of air in said chamber.

2. A cooling plant as defined in claim 1, wherein the total surface of the cooling members is larger than the portion thereof exposed to radiation from the product.

3. A cooling plant as defined in claim 1, further comprising at least one second cooling member disposed at a point substantially corresponding to the top of the natural convection current of air.

4. A cooling plant for cooling moisture-containing products comprising, in combination, a cooling chamber, first cooling members disposed within said chamber, product supporting means disposed within said chamber to place the products in alignment with said cooling members, means for substantially suppressing convection adjacent the products, said means comprising a plurality of spaced-apart braking strips extending away from the cooling members and substantially at right angles to the direction of the natural convection circulation of air in said chamber, and at least one second cooling member disposed at a point substantially corresponding to the top of the natural convection current of air.

5. A cooling plant for cooling moisture-containing products comprising, in combination, a cooling chamber, first cooling members disposed within said chamber, product supporting means disposed within said chamber to place the products in alignment with said cooling members, means for substantially suppressing convection adjacent the products, said means comprising a plurality of vertically spaced-apart braking strips extending away from said cooling members and substantially at right angles to the direction of the natural convection circulation of air in said chamber, and at least one second cooling member disposed at a point substantially corresponding to the top of the natural convection current of air.

References Cited in the file of this patent

UNITED STATES PATENTS

| | | |
|---|---|---|
| 1,925,033 | Finnegan | Aug. 29, 1933 |
| 2,192,348 | James | Mar. 5, 1940 |
| 2,237,256 | Finnegan | Apr. 1, 1941 |
| 2,254,420 | Cleveland | Sept. 2, 1941 |
| 2,425,714 | Baer | Aug. 19, 1947 |
| 2,454,704 | McMichael | Nov. 23, 1948 |
| 2,480,727 | Greyson | Aug. 30, 1949 |
| 2,489,918 | Menges | Nov. 29, 1949 |
| 2,540,956 | Morrison | Feb. 6, 1951 |
| 2,573,288 | Teeter | Oct. 30, 1951 |
| 2,578,049 | Dapprich | Dec. 11, 1951 |
| 2,705,678 | Morrison | Apr. 5, 1955 |